United States Patent [19]

Dick

[11] Patent Number: 5,197,447
[45] Date of Patent: Mar. 30, 1993

[54] ENGINE HAVING VALVE STROKE ADJUSTER AND FUEL PREHEATER

[76] Inventor: Leon B. Dick, P.O. Box 1037, Willow, Ak. 99688

[21] Appl. No.: 868,400

[22] Filed: Apr. 14, 1992

[51] Int. Cl.⁵ .................. F02M 31/16; F01L 1/18
[52] U.S. Cl. ........................ 123/557; 123/90.16; 123/41.85
[58] Field of Search .......... 123/41.41, 41.42, 41.85, 123/90.16, 90.43, 188.8, 434, 445, 557, 558

[56] References Cited

U.S. PATENT DOCUMENTS

| | | | |
|---|---|---|---|
| 480,535 | 8/1892 | Weatherhogg | 123/557 |
| 566,125 | 8/1896 | Barker | 123/557 |
| 1,505,145 | 8/1924 | Hesselman | 123/338 |
| 2,806,459 | 9/1957 | Sweat, Jr. | 123/90.16 |
| 3,115,125 | 12/1963 | Spencer et al. | 123/41.42 |
| 3,641,988 | 2/1972 | Torazza et al. | 123/90.16 |
| 3,894,520 | 7/1975 | Clawson | 123/531 |
| 4,201,167 | 5/1980 | Bayley | 123/557 |
| 4,285,310 | 8/1981 | Takizawa et al. | 123/90.16 X |
| 4,644,925 | 2/1987 | Hoppie et al. | 123/558 |
| 4,681,081 | 7/1987 | LaPan | 123/522 |
| 4,836,155 | 6/1989 | Slagley et al. | 123/90.16 |
| 4,911,124 | 3/1990 | Bennett | 123/321 |
| 4,986,227 | 1/1991 | Dewey, III | 123/90.16 |

FOREIGN PATENT DOCUMENTS

2335634 1/1975 Fed. Rep. of Germany ... 123/90.16

Primary Examiner—Tony M. Argenbright
Attorney, Agent, or Firm—Shlesinger, Arkwright & Garvey

[57] ABSTRACT

The present invention relates to an improved fluid vaporizer for use in conjunction with an internal combustion engine comprising intake and exhaust valves, each of the valves including seats. An exhaust valve seat insert is provided for receiving and directing unheated fuel around the exhaust valve seat whereby the fuel is preheated by the cylinder. An intake valve seat insert receives the heated fuel from the exhaust valve seat and directs the now heated fuel from the intake valve seat and into the cylinder for increased combustion efficiency. A valve stroke adjuster is also provided for increasing or decreasing the amount the inlet valve is opened.

34 Claims, 4 Drawing Sheets

FIG_1

ENGINE HAVING VALVE STROKE ADJUSTER AND FUEL PREHEATER

FIELD OF THE INVENTION

The present invention relates to internal combustion engines and more particularly to an engine provided with a unique valve stroke adjuster operating in conjunction with a fuel preheater to increase engine efficiency over a range of operating conditions and reduce emissions.

BACKGROUND OF THE INVENTION

In a conventional reciprocating internal combustion engine, a cylinder block is provided with a plurality of cylinders, therein, each containing a piston and connection means which reciprocates within the cylinder to drive a crankshaft. A cylinder head is positioned on the cylinder block to create a number of combustion chamber zones each of which is associated with one of the cylinders. The combustion chamber zones include inlet valve means which control through a complete range of power the flow of fuel/air into the cylinder prior to combustion and exhaust valve means for controlling the flow of exhaust gases which result from the combustion. The valve "lift" or "stroke" is the degree of opening of the inlet and exhaust valves. This opening is generally regulated by a valve train means comprising a camshaft containing an eccentric lobe. The lobe has a profile which directly affects the length of opening of the valve. Since the size and configuration of the lobe is static, the motion delivered to the valve for lift or length of stroke will be constant except for minor adjustments of valve lash.

Thus, conventional valve stroke arrangements for internal combustion engines often compromise engine performance as the engine revolutions per minute (RPM) vary. Generally speaking, more powerful engines are designed with a relatively longer stroke camshaft allowing such engines to develop maximum horsepower and torque at higher RPM's with a proportionate reduction in terms of overall fuel economy. Conversely, the more fuel efficient engines generally have a shorter valve stroke camshaft which concentrates horsepower and torque at lower engine RPMs however such engines lack the ability to generate high usable power. Consequently, conventional engine design has the effect of positioning a point of maximum efficiency either higher up or lower down on the RPM scale of the engine.

Variable stroke valve train mechanisms have been proposed in the prior art. U.S. Pat. No. 4,911,124 (Bennett) discloses a device which includes an adjustable fulcrum point which is positioned beneath the valve rocker arm in order to vary the stroke of the cylinder valve. U.S. Pat. No. 4,986,227 (Dewey, III) discloses a device to adjust valve lift in response to engine RPM by designing a rocker arm with a convex fulcrum-engaging top surface. A variable-positioned fulcrum assembly is adjustable along the top surface of the rocker arm to vary valve stroke accordingly. U.S. Pat. No. 4,836,155 (Slagley et al.) discloses a variable duration valve opening mechanism which includes a horizontally shiftable lifter device operating and positioned between the camshaft and the rocker arm. All of the above mentioned prior art devices are either complicated in design, expensive to install or require sophisticated control means to maintain. Further, none of the above mentioned devices interconnect a valve stroke adjustment mechanism with a fuel pre-heater to enhance fuel vaporization.

Prior art fuel pre-heating devices for internal combustion engines are also known. U.S. Pat. No. 4,644,925 (Hoppie et al.) discloses an apparatus for rapidly heating and vaporizing fuel prior to injection into a combustion chamber by directing the fuel through a heat exchange coil disposed within the flow path of the exhaust gases. "Vaporizing" refers to a fuel change from the liquid to the gaseous state without a change in the chemical composition of the molecules. Generally this is done by heating the liquid to atomize it or subdivide into a fine spray. U.S. Pat. No. 3,894,520 (Clawson) discloses a device to vaporize fuel prior to combustion whereby exhaust gases which exit the cylinder are allowed to pass over a conduit containing the fuel to pre-heat the same. Both of the above mentioned fuel pre-heating devices require heat exchange means which are positioned within the path of escaping exhaust gases and at a location remote from the point of gas release. Further, both devices are complicated in construction and require relatively elaborate means to function. Additionally, neither prior art device may be installed after construction of the internal combustion engine. Both require modification of the engine during manufacture. Lastly, neither device controls the amount of pre-heating by adjusting valve stroke for maximum fuel combustion efficiency.

A need has thus existed within the art for providing a mechanism to adjust valve stroke in response to engine RPM's which is highly efficient yet simple in design. Further, no prior art is in existence controls the fuel vaporization rate in response to engine RPM's. In view of the continued instability of current oil supply, as well as the deterioration of the environment from excessive emissions, a need has existed for an internal combustion engine which combines fuel economy, decreased pollutant emissions and increased power.

OBJECTS AND SUMMARY OF THE INVENTION

It is therefore an object of the present invention to provide an improved internal combustion engine which interlinks valve stroke adjustment and a fuel pre-heating device to thereby provide optimum power at either high RPM's or low RPM's with an appropriate adjustment of valve stroke and fuel vaporization.

Yet another object of the present invention is to provide a valve stroke adjustment means which has an uncomplicated design and can be easily retrofitted within a conventional engine.

Still a further object of the present invention is to provide a valve stroke adjustment means which may be adjusted rapidly either manually or automatically.

A still further object of the present invention is to provide a valve stroke adjustment means combining three separate adjustments so as to provide maximum precision in setting valve stroke.

Another object of the present invention is to provide a valve stroke adjustment means which can be installed at a minimum expense and may be fitted with a conventional valve train arrangement.

Yet another object of the present invention is to provide a valve stroke adjustment device which provides complete intake valve shut-off thereby preventing fuel from escaping into the cylinder when the unit is not operating.

A further object of the present invention is to provide a valve stroke adjustment device which allows complete intake valve shut off to forcibly retain fuel within the injection ports an fuel preheating passageways.

Still a further object of the present invention is to provide a fuel pre-heating arrangement for an internal combustion engine which pre-heats the fuel by circulating it around the exhaust valve seat prior to injection into the combustion chamber.

Another object of the present invention is to provide a fuel pre-heating device which is arranged in connection with a valve stroke adjustment means so that the amount of heat generated to vaporize the fuel is controlled by adjusting the valve stroke.

Yet a further object of the present invention is to provide a valve stroke adjuster and fuel preheater which allows a conventional internal combustion engine to operate on any of a variety of fuel sources with no engine modification required.

The present invention relates to a valve stroke adjustment device for use in conjunction with an internal combustion engine provided with engine cylinder means and comprising a valve means which reciprocates along a valve stroke path between opened and closed positions into the cylinder. A floating rocker arm means is also provided and has a top surface, bottom surface, first end and second end with a pivot therebetween. The floating rocker arm second end is engagable with the valve means to cause reciprocation. A linkage means having first and second ends is also provided with the linkage means first end pivotally mounted to a fixed point and the linkage means second end pivotally mounted to the floating rocker arm pivot. An actuator cam means, engagable with the floating rocker arm first end is provided to effect reciprocation movement to the floating rocker arm and cause the floating rocker arm to arc about the floating rocker arm pivot thereby urging reciprocation of the valve means along the valve stroke path. A variable positioned fulcrum means engagable against the floating rocker arm top surface is provided whereby selective positioning of the fulcrum means along the top surface will vary the arc of movement of the floating rocker arm second end and proportionally modify the length of the valve means reciprocation.

The present invention also relates to an improved fluid fuel heating means for use in conjunction with an internal combustion engine comprising intake and exhaust valves, each of the valves including seats. An exhaust valve seat means is provided for receiving and directing unheated fuel around the exhaust valve seat whereby the fuel is pre-heated by the cylinder means. An intake valve seat receives the heated fuel from the exhaust valve seat and includes means for directing the now heated fuel from the intake valve seat and into the cylinder for increased combustion efficiency.

An improved, high efficiency internal combustion engine is provided containing engine cylinder means and comprising a cylinder valve means including at least one reciprocating intake valve for controlling flow of fuel and air collectively into the engine cylinder means and at least one reciprocating exhaust valve means controlling the flow of exhaust gases therefrom. A fuel preheating means is provided and positioned about the cylinder valve means for heat exchange preheating of the fuel prior to injection into the engine cylinder means. A valve stroke adjustment means is also provided for increasing or decreasing the amount the inlet valve is opened whereby lengthening of the valve stroke will increase the length of time the inlet valve is open thereby reducing the amount of heat exchange vaporization of the fuel by the pre-heating means. Conversely, shortening of the valve stroke by the valve stroke adjustment means will reduce the length of time the inlet valve is open thereby increasing the amount of heat exchange of the fuel by the pre-heating means and thus improving overall engine performance while reducing pollution emissions throughout the power range of the engine.

The manner in which all of the above objects as well as other objects of the present invention can be accomplished will be apparent from the following drawings and detailed description.

BRIEF DESCRIPTION OF THE DRAWINGS

FIGS. 4A through 4C illustrate the operation of the valve stroke adjustment means according to the present invention showing the relative change in valve stroke. FIG. 4A illustrates idle cut-off position, FIG. 4B illustrates partial power while FIG. 4C indicates full or maximum power.

DETAILED DESCRIPTION OF THE PREFERRED EMBODIMENT

Figure 1:
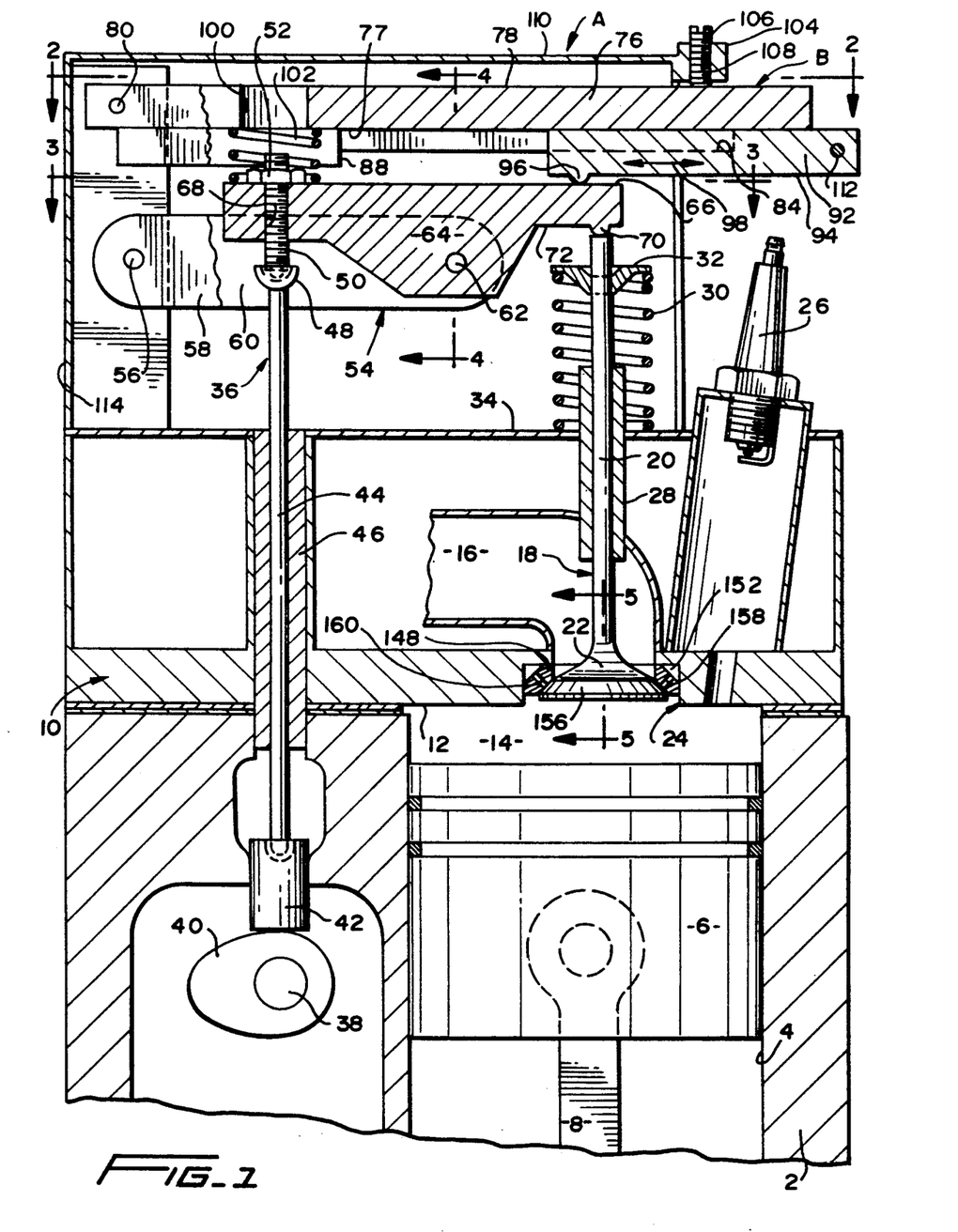
FIG. 1 illustrates a cross sectional view of a cylinder head and engine block according to the present invention and containing the valve stroke adjustment means and the fuel pre-heating means positioned around the intake valve invention.

As best shown in FIG. 1, a portion of a conventional reciprocating piston internal combustion engine is shown and includes a cylinder block 2 having formed therein a cylinder bore 4, with a piston 6 adapted to be reciprocated therein by a crankshaft (not shown) attached to piston rod 8 and in a manner well known to those skilled in the art.

A cylinder head 10 is formed with an internal surface portion 12 and together with the piston 6 and cylinder bore 4, define a combustion chamber 14. The combustion chamber 14 is supplied with a quantity of air for each combustion cycle by means including intake air passage 16 and intake valve 18 comprising of valve stem 20 and valve head 22 generally positioned within valve seat means 24. A co-acting exhaust valve (not shown) is also provided to allow the escape of combustion gases from the combustion chamber.

An ignition means 26 which may be a conventional spark plug is also provided for the purposes of igniting the quantity of fuel and air within the combustion chamber 14 as is well known within the art. The intake valve 18 is vertically positioned within the cylinder head 10 by a sleeve 28 allowing reciprocating movement therethrough. A spring 30 is also provided and positioned between a valve shoulder 32 and cylinder head surface 34 so as to urge the intake valve 18 to a closed position as shown in FIG. 1.

The intake valve 18 is operated in a timed relationship with the movement of the piston by appropriate valve train 36. A rotating camshaft 38, containing an eccentric cam surface 40 is positioned against the lower end 42 of push rod 44. The push rod 44 is positioned for vertical reciprocation within a tube 46. While the variable stroke valve stem of the present invention is illustrated with a push rod type engine, it can be readily modified for use with a overhead cam type engine. Push rod upper end 48 is formed to accommodate the lower end of a rocker arm adjustment means 50. The rocker arm adjustment means 50 may be threaded to accommodate a nut 52 as is commonly known in the art.

Figure 3:
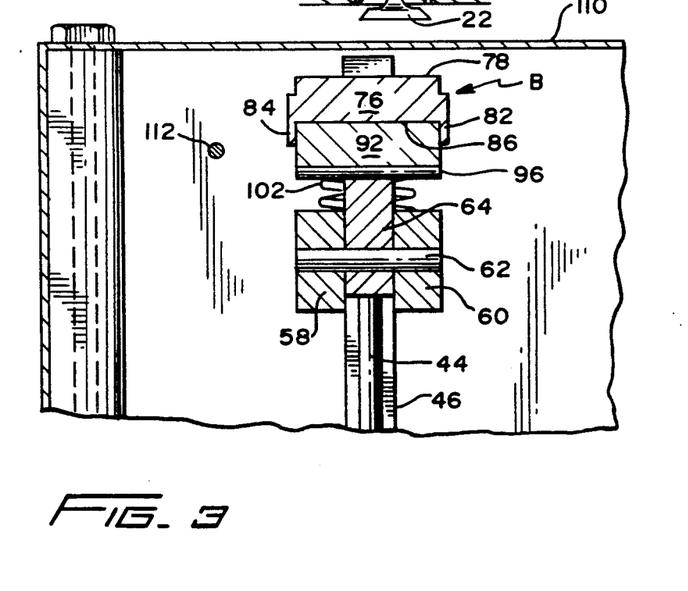
FIG. 3 is an end view taken along lines 3—3 of FIG. 1 and illustrating the variable position fulcrum means and the floating rocker arm means with portions of the cylinder head broken away.

A linkage assembly 54 is pivotally mounted at pivot point 56 to a fixed point within the cylinder head 10. As best shown in FIG. 3, the linkage 54 may be provided with a pair of interconnected parallel arms 58 and 60 forming a space therebetween. The end of the linkage assembly 54 opposite pivot 56 is provided with a second pivot 62 for attachment to floating rocker arm 64. The floating rocker arm assembly 64 is rested between the linkage arms 58 and 60 of linkage 54.

Floating rocker arm 64 is also provided with an upper or top surface 66 which is generally smooth and planar. A first end of floating rocker arm 64 is provided with a bore 68 extending through the rocker arm 64. An adjustment means 50 is inserted through bore 68 and secured at its upper end by the nut 52. The opposite end of floating rocker arm 64 is provided with a raised portion 70 extending from rocker arm bottom surface 72. The raised portion 70 abuts against the end of the intake valve stem 20. Thus, rotation of the camshaft 38 will in turn rotate cam lobe 40 thereby urging push rod 44 upwardly and causing movement of valve 18 in a generally opposite direction. In the case of the embodiment shown in FIG. 1, valve 18 moves in a downward direction and unseats the valve head 22 from the valve seat means 24. Continued movement of the camshaft 38 causes a lowering of push rod 44 to its original position and return of the intake valve head 22 to its seat 24.

Figure 2:
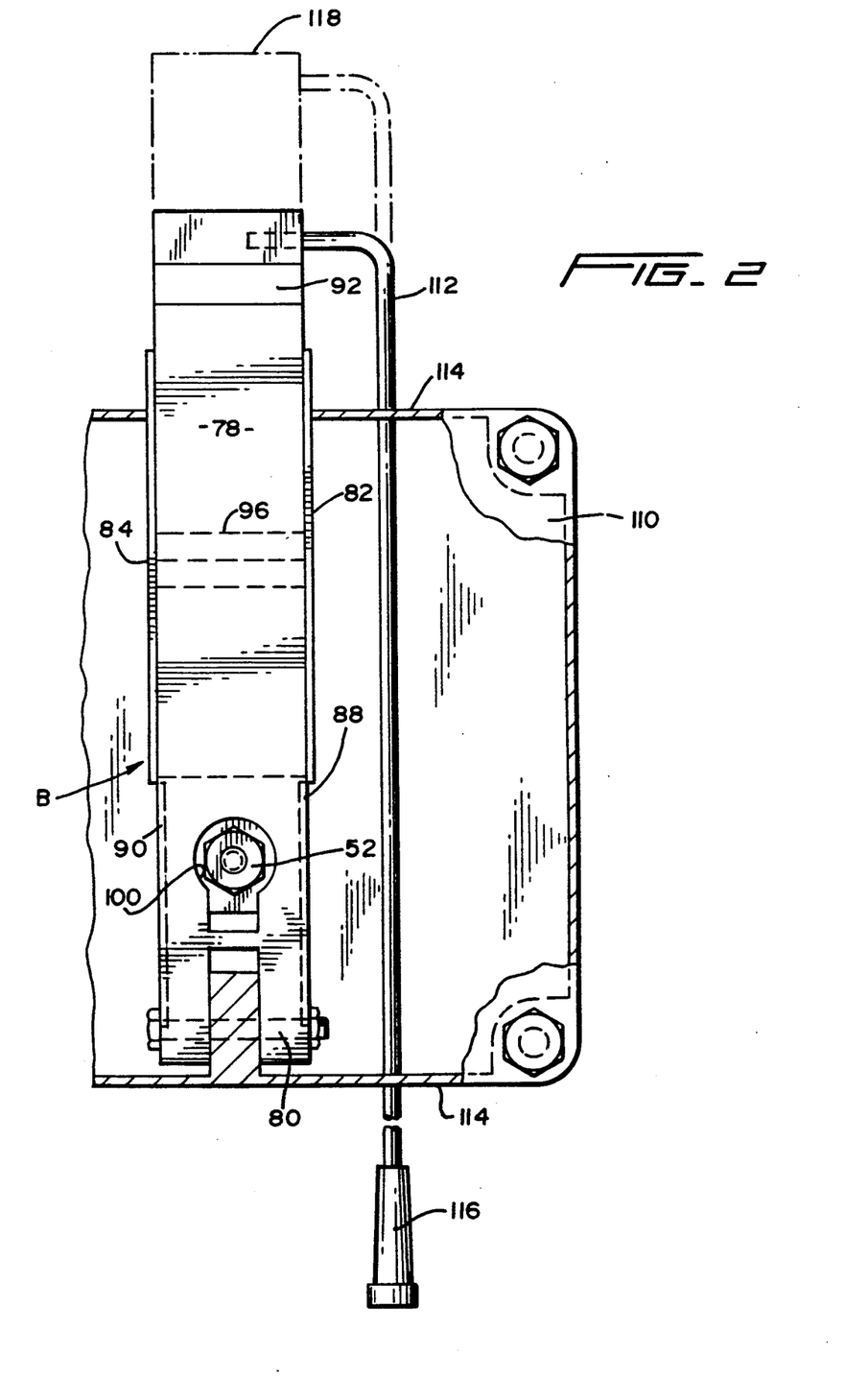
FIG. 2 is a top plan view taken along line 2—2 of FIG. 1 with portions of the cylinder head broken away and showing the range of motion of the fulcrum bar in phantom lines.

As best shown in FIGS. 1, 2 and 3, the variable position fulcrum unit B consists of a stabilizer bar 76 which includes a stationary pivot 80 at one end thereof allowing the variable position fulcrum unit B to pivot along a vertical plane. The stabilizer bar 76 includes a generally planar top surface 78 and pair of sidewalls 82 and 84 thereby forming a generally U-shaped channel 86 extending along the longitudinal axis of the stabilizer bar 76. A pair of stop means 88 and 90 further extend from the sidewall 82 and 84 respectively.

Turning now to FIGS. 1 and 3, a sliding fulcrum bar 92 is positioned within the U-shaped channel 86 of the stabilizer bar 76. The top and side surfaces of fulcrum bar 92 are generally smooth and planar in shape and thus provide a secure and matching fit within the U-shaped channel 86 while still allowing longitudinal sliding movement therein. The bottom surface 94 of the fulcrum bar 92 contains at one end thereof a raised fulcrum surface 96 descending both downwardly from the bottom surface 94 and across the width of the fulcrum bar 92. Thus, the fulcrum bar 92 is slidably adjustable within the U-shaped channel 86 and in directions as indicated by arrow 98.

The stabilizer bar 76 is also provided with an opening 100 in top surface 78 extending vertically through the stabilizer bar 76 to allow access to adjustment nut 52 associated push rod 44. A spring 102 is situated between the bottom surface 77 of the stabilizer bar 76 and the top surface 66 of the floating rocker arm 64 and directly beneath the opening 100 so as to provide a bias for said push rod 44.

A stabilizer bar adjustment means 104 is also provided and includes a vertically adjustable abutment or screw 106 extending through bore 108 within headpan top surface 110. As is apparent, vertical adjustment of screw 106 will result in angular repositioning of the stabilizer bar 76 about its fixed pivot 80. The spring 102 also provides a countervailing upward force to urge the stabilizer bar 76 against the adjustment means 104.

As best shown in FIG. 2, fulcrum bar 92 is provided with an L-shaped actuator arm 112 extending along the longitudinal axis of the stabilizer bar 76. The actuator arm 112 extends through sidewall 114 of the headpan and includes a control knob 116 at the end of the actuator arm 112. As shown by phantom lines 118, reciprocating movement of the actuator arm 112 causes either extension or retraction of the fulcrum bar 92 within the stabilizer bar 76. It is however within the scope of the present invention to control movement of the fulcrum bar 92 by hydraulic or electromechanical means.

Figures 4A, 4B, 4C:
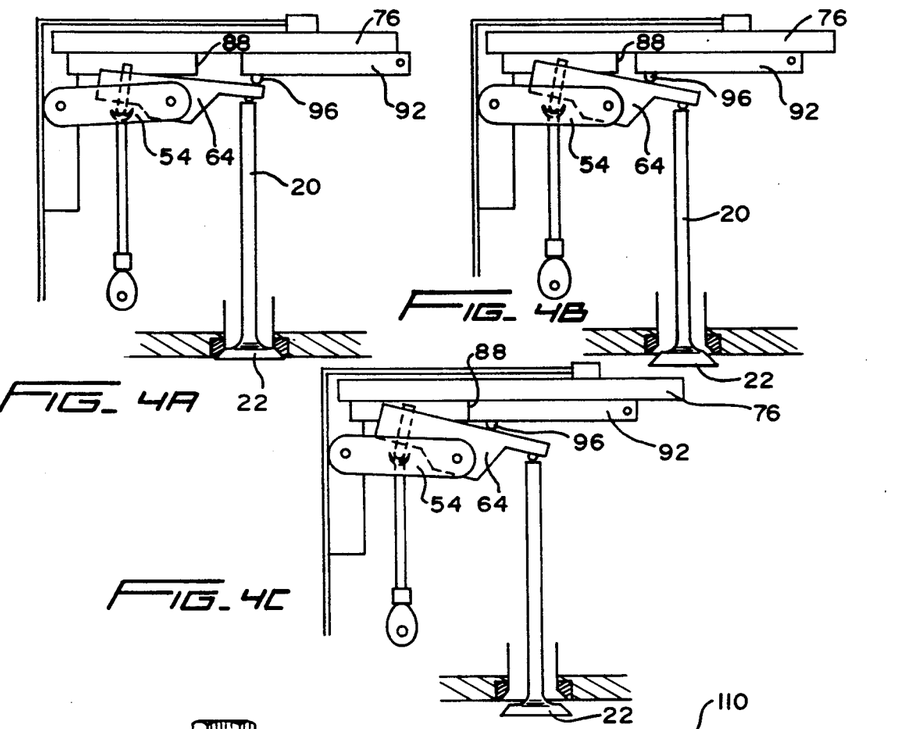

In operation and as illustrated in FIG. 4A, when the fulcrum bar 92 is situated in its "full-out" position, the fulcrum engaging surface 96 is positioned at a second end of the floating rocker arm 64 and directly above the intake valve stem 20. The full-out position of FIG. 4A has the effect of preventing any movement of valve 20 and restricts the position of the valve head 22 to the valve seat 24. All fuel is cut off from entering the cylinder when in this position.

FIG. 4B illustrates a modification of valve stroke length by the movement of the fulcrum bar inward from the position shown in FIG. 4A. This repositioning of the fulcrum engaging surface from its rightmost position in FIG. 4A to a leftward position as shown in FIG. 4B has several effects. First, it moves the point of contact of fulcrum engaging surface 96 nearer to floating rocker arm pivot point 62. Because the floating rocker arm 64 has the ability to move freely along a vertical plane by virtue of linkage 54 and fixed pivot 56, the valve 22 opens to an even greater extent.

As best illustrated FIG. 4C, when the fulcrum bar 92 is moved to its full open position and at which point it abuts against the stop means 88, the floating rocker arm 64 is urged by the fulcrum engaging surface 96 to an even lower position by virtue of pivot linkage 54. This repositioning of rocker arm 64, enables the valve stroke to be extended to its longest position possibly allowing the greatest amounts of fuel and oxygen to enter the combustion chamber on the intake stroke.

It can be appreciated then that between the full open position indicated in FIG. 4C and the full closed position illustrated in FIG. 4A, a variety of stroke length adjustment is possible. The engine is no longer restricted to a pre-set valve stroke length. An operator running an engine at lower RPM's requires a shorter valve stroke in terms of engine efficiency and may now pullout the fulcrum to achieve it. Conversely, at higher RPM's an operator would set the fulcrum bar 92 closer to the full-in position to produce a longer valve stroke thereby allowing more fuel and oxygen to enter the cylinder.

Figure 5:
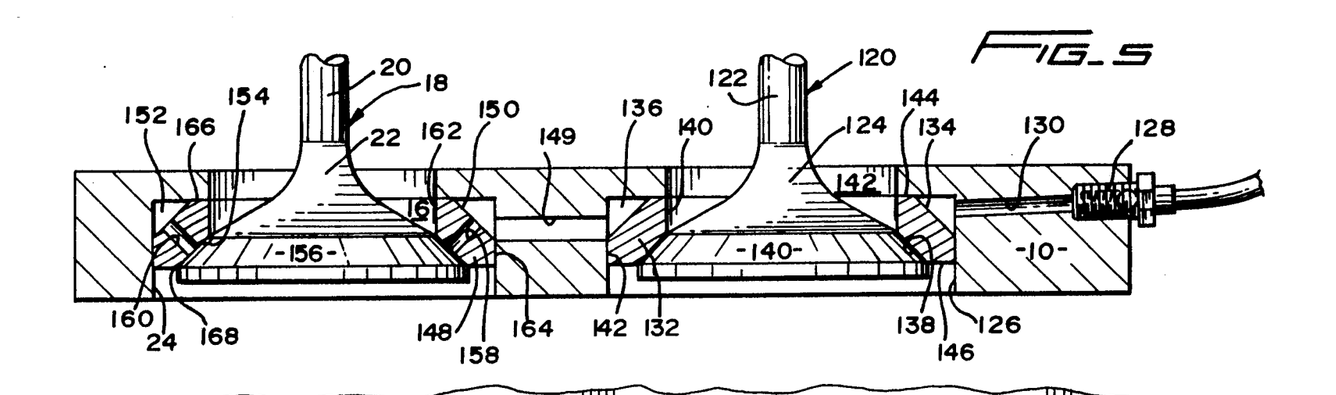
FIG. 5 is an enlarged cross sectional end view of the fuel pre-heating means according to the present invention with portions of the cylinder head and intake and exhaust valve stems broken away therefrom.
Figure 6:
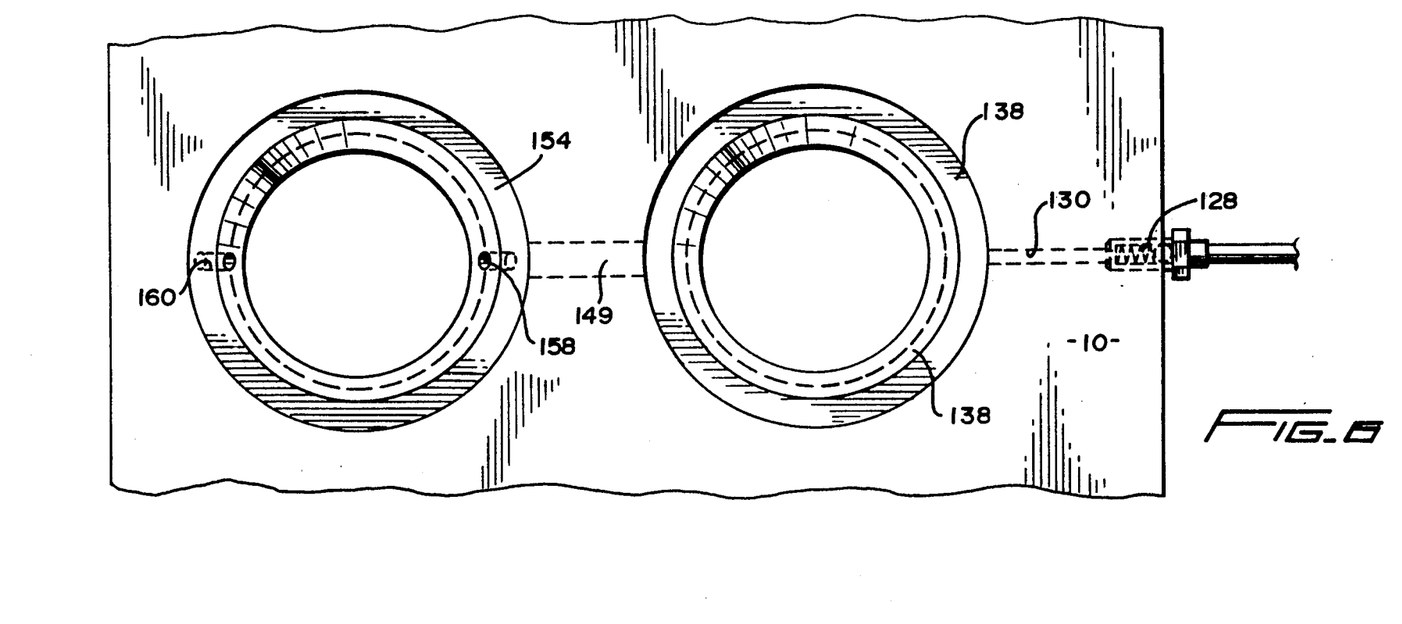
FIG. 6 is a bottom plan view of the fuel preheating means shown in FIG. 5 without the valves in place and with portions of the cylinder head broken away.

The present valve stroke adjustment arrangement will also operate in conjunction with a fuel pre-heating means to regulate the degree of fuel heating prior to its injection within the cylinder. As best illustrated in FIGS. 5 and 6, intake valve 18 is shown in association with a co-acting exhaust valve 120 as is commonly known in the art. The intake valve 18 includes a valve stem 20 as well as a valve head 22. Similarly, the exhaust valve 120 includes a valve stem 122 and a valve head 124. An intake valve seat means 24 and exhaust valve seat means 126 are provided for each of the respective valves. A fuel inlet 128 is shown extending into the cylinder head 10 and in fluid communication with a fuel source (not shown). An inlet passageway 130 is also provided within the interior of the cylinder head 10 for directing fuel to the exhaust valve seat means 126.

Fitted within the exhaust valve seat means 126 is an exhaust valve insert 132. The exhaust valve insert 132 is provided with an interior surface 134 defining a fluid passageway 136 extending annularly around and between the valve seat 126 and the interior surface 134. The exhaust valve insert 132 also contains an exterior surface 138 which mates with exhaust valve head surface 140 when exhaust valve 120 is closed. Valve surface 140 extends the exterior perimeter of exhaust valve head 124 and acts as a seat for the exhaust valve 120 when it is in its closed position. The exhaust valve insert interior surface 134 and exterior surface 138 are frustoconical and concentric in shape with respect to each another. The exhaust valve insert 132 is further provided with an inner vertical surface 140 which forms a portion of the exhaust outlet 142. An outer vertical surface 142 is also provided and forms the exterior of the exhaust valve insert 132. Top surface 144 and bottom surface 146 of insert 132 allow the insert 132 to be securely positioned within the valve seat 126.

An interconnecting passageway 149 is positioned within the cylinder head 10 and in fluid communication with exhaust valve passageway 136 and the intake valve seat means 24. An intake valve insert 148 is positioned within the intake valve seat means 24. Intake valve insert 148 is substantially similar in design to the exhaust valve insert 132 described above. The intake valve insert 148 includes an interior surface 150 defining a circumferential fluid passageway 152 which is in fluid communication with interconnection passageway 149. An exterior surface 154 is also provided and forms a seat for intake valve 18 at valve surface 156. The intake valve insert 148 interior surface 150 and exterior surface 154 are shaped frustoconical and concentric with respect to each other. A fluid injection passageway 158 extends from said interior surface 150 to exterior surface 154 and is in fluid communication with fluid passageway 152 of intake valve seat means 24. A second fluid injection passageway 160 may also be provided in a location opposite from the fluid injection passageway 158. It is within the scope of the present invention to employ any number of fluid passageways depending upon the requirements of the engine selected. The intake valve insert 148 is further provided with inner vertical surface 162 which forms a portion of air intake 16.

The exhaust valve seat insert 132 and the intake valve seat insert 148 may be constructed from a variety of materials which maintain their integrity under the high pressure and extreme heat generally associated with internal combustion engines. Applicant has found that stellite ®, and high strength alloy is preferable. However, it is within the scope of the present invention to construct the inserts 132 and from any of a variety of materials available and known within the art for use in conjunction with internal combustion engines.

In operation, fuel enters the inlet 128 through a check valve and into passageways 130 where it is directed around the valve seat means 120 through passageway 136. The generated heat radiating from the cylinder and the hot exhaust gases exiting around the open exhaust valve 120 heat the fuel through heat exchange as it passes between the exhaust valve insert 132 and surrounding walls of the cylinder head 10. The heated fuel continues its passage through interconnection passageway 148 and into the inlet valve passageway 152 where after opening of the valve head 22 from the exterior surface 154 of intake insert 148, the pre-heated fuel is injected into the cylinder through injection passages 158 and 160. Thus, each time the intake valve 18 is opened to allow air to enter into the combustion chamber (not shown), a desired quantity of heated fuel is allowed to be injected and intermixed into the cylinder. Applicant has found that this vaporized fuel provides an improved combustion mixture with more efficient burning of the fuel.

When the above described fuel pre-heating arrangement given in FIGS. 5 and 6 is used in conjunction with the valve stroke adjustment means earlier described, a more efficient engine having a reduction in the amount of pollutants is provided. If the engine is being run at lower temperatures and RPMs, the valve stroke can be adjustably shortened by moving the fulcrum bar 92 closer to its full-out position as noted earlier. The valve stroke is thereby shortened allowing the fuel within the pre-heater passageways 136 to spend more time within the passageway 136 and thus subjected to a higher rate of preheating prior to injection into the cylinder. Since the engine is running at lower RPMs and is less efficient, this increased fuel preheating raises the efficiency of the engine.

Conversely, when the engine is being run at higher RPMs, the fulcrum engaging surface 96 can be adjusted to increase the length of valve stroke thereby allowing more oxygen and fuel to enter the cylinder during each intake cycle. The longer stroke of the intake valve 18 directly decreases the length of time the fuel spends within the passageway 136 of the exhaust valve seat 126. This reduction in time the fuel spends within the passageway 136 results in reduced thermal treatment of the fuel. Since at higher RPMs the engine is running at increased temperatures, and more efficiently and with a longer valve stroke, less fuel preheating is required. Thus, adjustment of valve stroke is directly related to the amount of thermal treatment of the fuel as it passes through the fuel preheating arrangement of the present invention. Accordingly, the highest efficiency possible is maintained whether the engine is running at higher RPMs or lower RPMs or at different operating temperatures by selective adjustment of the valve stroke and the related fuel preheating arrangement.

Applicant has found that any number of alternative fuels are readily acceptable for use with the engine according to the present invention. Virtually no substantive engine modifications required. Gasoline, methanol, ethanol, isopropyl, mixtures of gasoline and diesel, propane, charcoal lighter fluid and liquified natural gas are all acceptable fuel sources. The only variation to the engine relates to an adjustment of fuel pressures depending upon the selected fuel.

While this invention has been disclosed as having a preferred design, it is understood that it is capable of further modifications, and uses and/or adaptations of the invention and following in general the principle of the invention and including such departures from the present disclosure as come within the known or customary practice in the art of which the invention pertains, and as may be applied to the central features hereinbefore set forth, and fall within the scope of the invention or limits of the claims appended hereto.

I claim:

1. A valve stroke adjustment means for use in conjunction with an internal combustion engine provided with engine cylinder means and comprising:
   a) a valve means, said valve means reciprocating along a valve stroke path between open and closed positions to said cylinder means;
   b) floating rocker arm means having a top surface, bottom surface, first end, second end and pivot therebetween, said floating rocker arm second end engagible with said valve means to cause reciprocation;
   c) linkage means having first and second ends, said linkage means first end pivotally mounted to a fixed point and said linkage means second end pivotally mounted to said floating rocker arm pivot;
   d) actuator cam means engagible with said floating rocker arm first end to provide reciprocating movement thereto causing said floating rocker arm to arc about said floating rocker arm means pivot and thereby urge reciprocation of said valve means along said valve stroke path; and,
   e) variable position fulcrum means engagible against said floating rocker arm means top surface whereby selective positioning of said fulcrum means along said top surface will vary the arc of movement of said floating rocker arm and proportionally modify the length of valve means reciprocation and engine power.

2. A variable stroke adjustment means as in claim 1, and wherein:
   a) said variable position fulcrum means comprising a stabilizer bar means having a first end, second end, top and bottom, said stabilizer bar means housing a movable fulcrum bar for longitudinal movement therein along a generally horizontal plane, said variable position fulcrum means positioned above and in vertical alignment with said floating rocker arm means for engagement of said movable fulcrum bar with said floating rocker arm.

3. A variable stroke adjustment means as in claim 2, and wherein:
   a) said stabilizer bar means including a downwardly extending U-shaped guide means generally extending from said stabilizer bar means first end to said stabilizer bar means second end, said guide means housing said movable fulcrum bar.

4. A variable stroke adjustment means as in claim 3, and wherein:
   a) said fulcrum bar including a raised portion for engagement against said floating rocker arm means top surface, said raised portion extending transverse to the longitudinal axis of said fulcrum bar.

5. A variable stroke adjustment means as in claim 4, and wherein:
   a) said stabilizer bar means including stop means for limiting travel of said fulcrum bar towards one of said stabilizer bar means ends.

6. A variable stroke adjustment means as in claim 5, and wherein:
   a) said stabilizer bar means including an opening extending through said top for allowing access to a valve lash adjustment means associated with said floating rocker arm first end.

7. A variable stroke adjustment means as in claim 6, and wherein:
   a) one of said stabilizer bar ends pivotally mounted to a fixed point thereby allowing said stabilizer bar to arc about said pivot along a vertical plane.

8. A variable stroke adjustment means as in claim 7, and wherein:
   a) said stabilizer bar means including an adjustment means for selective positioning of said stabilizer bar along a vertical plane.

9. A variable stroke adjustment means as in claim 8, and wherein:
   a) said adjustment means comprising a vertically adjustable abutment portion positioned for adjustable contact against said stabilizer bar means top surface, said stabilizer bar means bottom surface provided with spring means for upward urging of said stabilizer bar against said abutment portion.

10. A variable stroke adjustment means as in claim 5, and wherein:
    a) said movable fulcrum bar provided with first and second ends, one of said ends including a control arm extension for remotely adjusting movement of said movable fulcrum bar.

11. A variable stroke adjustment means as in claim 10, and wherein:
    a) said control arm extension having a generally L-shaped configuration including first and second ends, said control arm first end attached to said fulcrum bar means first end and said control arm second end remotely positioned from said variable position fulcrum means such that said control arm extends generally parallel to said movable fulcrum bar.

12. A variable stroke adjustment means as in claim 10, and wherein:
    a) said raised portion positioned at one of said movable fulcrum bar ends.

13. A variable stroke adjustment means as in claim 12, and wherein:
    a) said stop means comprising at least one abutment, flange vertically extending from said stationary bar means into the path of travel of said raised portion for contact thereagainst.

14. An improved fuel preheating means for use in conjunction with an internal combustion engine provided with engine cylinder means and comprising:
    a) intake and exhaust valves, and including seats for said valves;
    b) exhaust valve seat means for receiving and directing unheated fuel around said exhaust valve seat whereby said fuel is heated by said cylinder means;
    c) intake valve seat means for receiving heated fuel from said exhaust valve seat means, and
    d) means for directing said heated fuel from said intake valve seat means and into said cylinder means for increased combustion efficiency.

15. A fuel preheating means as in claim 14, and wherein:

a) said exhaust valve seat means including an exhaust valve seat insert positioned within said exhaust valve seat, said exhaust valve seat insert including an interior surface defining a fluid passageway extending between said exhaust valve seat insert and said exhaust valve seat and an exterior surface for engagible contact with said exhaust valve.

16. A fuel preheating means as in claim 15, and wherein:
   a) said intake valve seat means including an intake valve seat insert positioned within said intake valve seat, said intake valve seat insert including an interior surface defining a fluid passageway extending between said intake valve insert and said intake valve seat and an exterior surface for engagible contact with said intake valve.

17. A fuel preheating means as in claim 16 and further including:
   a) an interconnection fluid passageway extending between and in fluid communication with said exhaust valve fluid passageway and said intake valve fluid passageway.

18. A fuel preheating means as in claim 16, and wherein:
   a) said intake seat insert including at least one fluid injection passageway extending between said interior and said exterior surfaces and in fluid communication therewith.

19. A fuel preheating means as in claim 17, and wherein:
   a) said intake valve seat insert interior and exterior surfaces are frustoconical and concentric with respect to each other.

20. A fuel preheating means as in claim 17, and wherein:
   a) said exhaust valve seat insert interior and exterior surfaces are frustoconical and concentric with respect to each other.

21. An improved high efficiency internal combustion engine provided with engine cylinder means and comprising:
   a) cylinder valve means including at least one reciprocating intake valve for controlling flow of fuel/air into said engine cylinder means and at least one reciprocating exhaust valve means controlling the flow of exhaust gases therefrom;
   b) fuel preheating means positioned about said cylinder valve means for heat exchange of the fuel prior to injection into said engine cylinder means; and
   c) valve stroke adjustment means for increasing or decreasing the amount of time said inlet valve is open whereby lengthening of said valve stroke will increase the amount of time said inlet valve is open and reduce the amount of heat exchange of the fuel by said preheating means and shortening of said valve stroke will reduce the amount of time said inlet valve is open and increase the amount of heat exchange of the fuel by said preheating means thereby improving engine performance.

22. An improved high efficiency internal combustion engine as in claim 21 and further comprising:
   a) said valve stroke adjustment means including a floating rocker arm means having a top surface, bottom surface, first end, second end and pivot therebetween, said rocker arm second end engagible with said valve means to cause reciprocation;
   b) linkage means having first and second ends, said linkage means first end pivotally mounted to a fixed point and said linkage means second end pivotally mounted to said floating rocker arm pivot;
   c) actuator cam means engagible with said floating rocker arm first end to provide reciprocating movement thereto for causing said floating rocker arm to arc about said floating rocker arm means pivot and thereby urge reciprocation of said valve means; and
   d) variable position fulcrum means engagible against said floating rocker arm means top surface whereby selective positioning of said fulcrum means along said top surface will vary the arc of movement of said floating rocker arm and selectively modify the length of valve means reciprocation.

23. An improved high efficiency internal combustion engine as in claim 22, and wherein:
   a) said variable position fulcrum means comprising stabilizer bar means having a first end second end, top and bottom, said stabilizer bar means housing a movable fulcrum bar for longitudinal movement therein along a generally horizontal plane, said variable position fulcrum means positioned above and in vertical alignment with said floating rocker arm means for engagement of said movable fulcrum bar with said floating rocker arm.

24. An improved high efficiency internal combustion engine as in claim 23, and wherein:
   a) said fulcrum bar including a raised portion for engagement against said floating rocker arm means top surface, said raised portion extending transverse to the longitudinal axis of said fulcrum bar.

25. An improved high efficiency internal combustion engine as in claim 24, and wherein:
   a) said stabilizer bar means provided with an opening extending through said top for allowing access to a valve lash adjustment means associated with said first end of said floating rocker arm.

26. An improved high efficiency internal combustion engine as in claim 24, and wherein:
   a) one of said stabilizer bar ends pivotally mounted to a fixed point thereby allowing said stabilizer bar to arc about said pivot along a vertical plane; and
   b) said stabilizer bar means including an adjustment means for selective positioning of said stabilizer bar along a vertical plane.

27. An improved high efficiency internal combustion engine as in claim 26, and wherein:
   a) said adjustment means comprising a vertically movable abutment portion positioned for contact against said stabilizer bar means top surface, said stabilizer bar means bottom surface provided with spring bias means for urging said stabilizer bar top surface against said abutment portion.

28. An improved high efficiency internal combustion engine as in claim 22, and further comprising:
   a) said fuel preheating means including seats for said intake valve and said exhaust valve;
   b) exhaust valve seat means for receiving and directing unheated fuel around said exhaust valve seat whereby said fuel is heated by said cylinder means;
   c) intake valve seat means for receiving heated fuel from said exhaust valve seat means; and
   d) means for directing said heated fuel from said intake valve seat means and into said cylinder means.

29. An improved high efficiency internal combustion engine as in claim 28, and wherein:

a) said exhaust valve seat means including an exhaust valve seat insert positioned within said exhaust valve seat, said exhaust valve seat insert including an interior surface defining a fluid passageway extending between said exhaust valve seat insert and an exterior surface for mating with said exhaust valve.

30. An improved high efficiency internal combustion engine as in claim 29, and wherein:
 a) said intake valve seat means including an intake valve seat insert positioned within said intake valve seat, said intake valve seat insert including an interior surface defining a fluid passageway extending between said intake valve insert and said intake valve seat and an exterior surface for mating with said intake valve.

31. An improved high efficiency internal combustion engine as in claim 30 and further comprising:
 a) an interconnection fluid passageway extending between and in fluid communication with said exhaust valve fluid passageway and said intake valve fluid passageway.

32. An improved high efficiency internal combustion engine as in claim 30, and wherein:
 a) said intake valve seat insert including at least one fluid injection passageway extending between said interior surface and said exterior surface and in fluid communication therewith.

33. An improved high efficiency internal combustion engine as in claim 31, and wherein:
 a) said intake valve seat insert interior and exterior surfaces are frustoconical and concentric with respect to one another.

34. An improved high efficiency internal combustion engine as in claim 31, and wherein:
 a) said exhaust valve seat insert interior and exterior surfaces are frustoconical and concentric with respect to one another.

* * * * *